Patented Aug. 12, 1924.

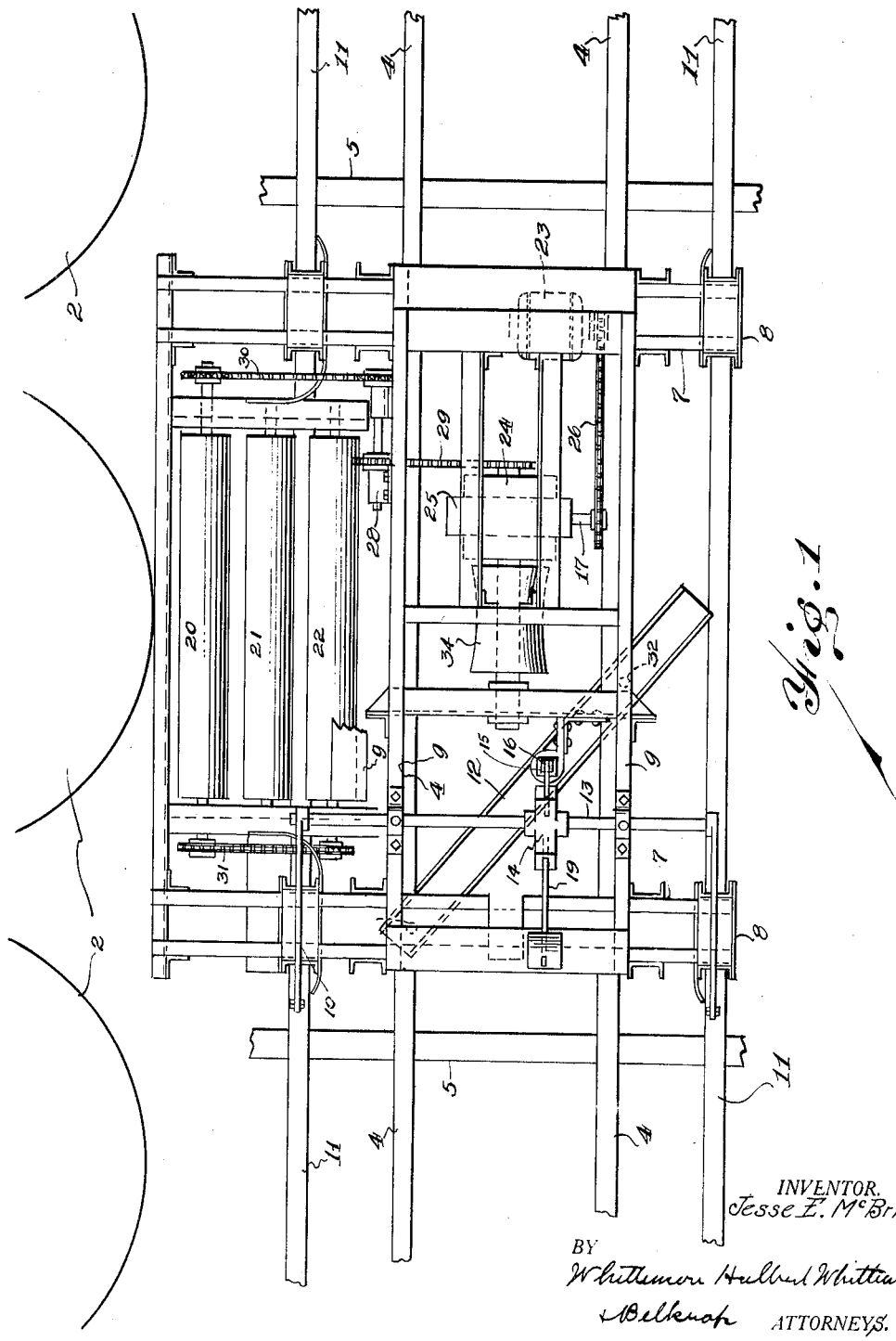

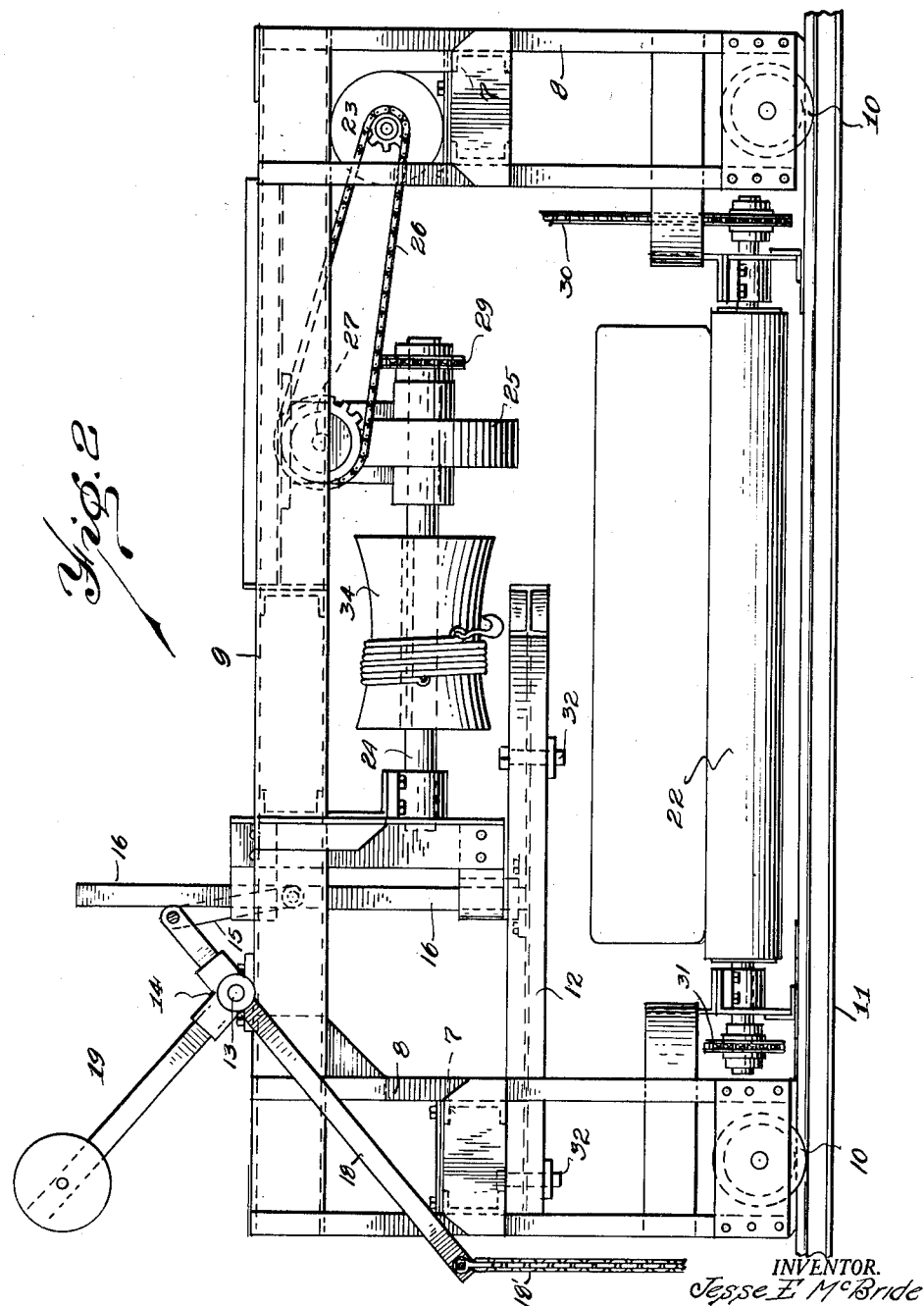

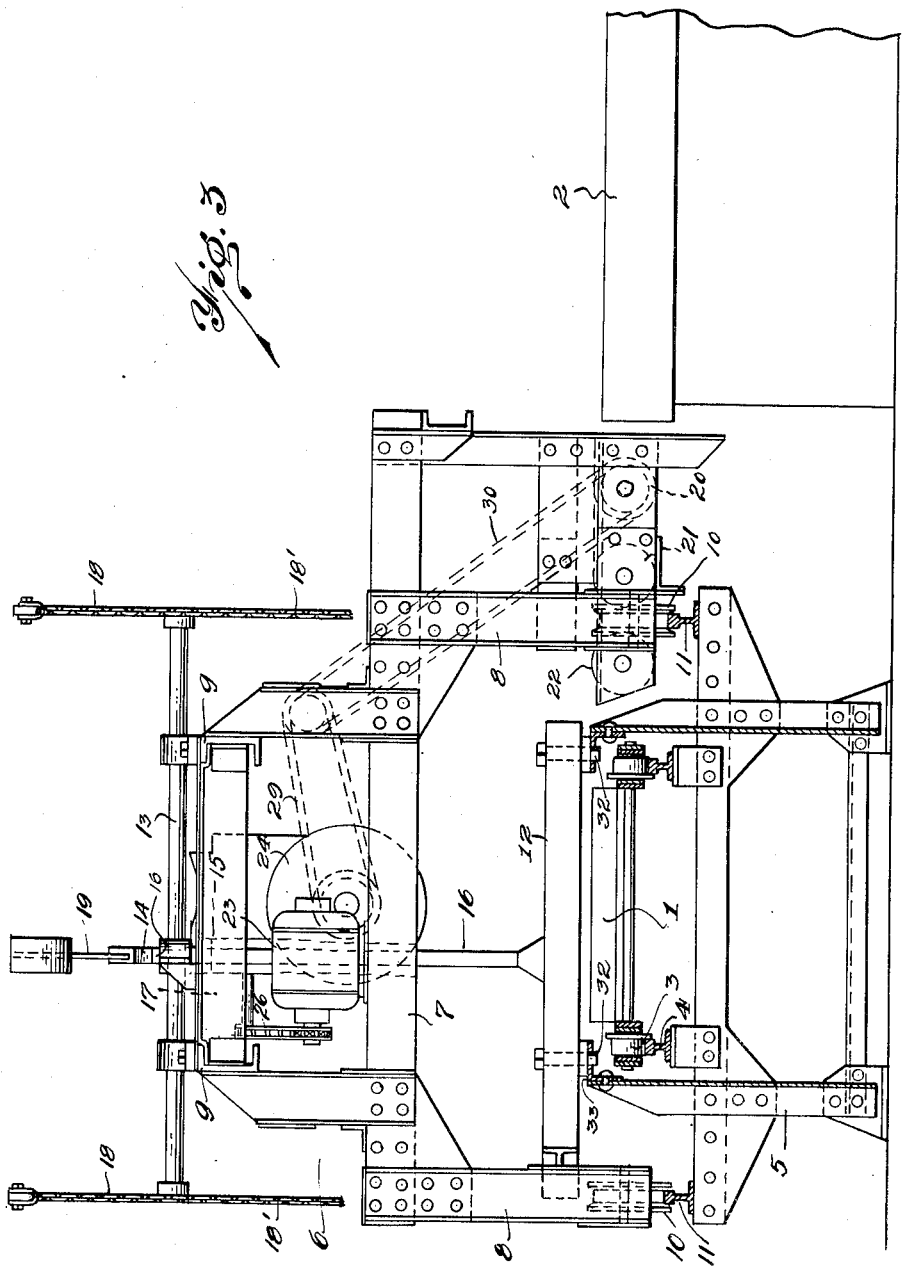

1,504,894

UNITED STATES PATENT OFFICE.

JESSE E. McBRIDE, OF DETROIT, MICHIGAN, ASSIGNOR TO PALMER-BEE COMPANY, OF DETROIT, MICHIGAN, A CORPORATION OF MICHIGAN.

MOLD LOADER.

Application filed November 7, 1921. Serial No. 513,265.

*To all whom it may concern:*

Be it known that I, JESSE E. McBRIDE, a citizen of the United States of America, residing at Detroit, in the county of Wayne and State of Michigan, have invented certain new and useful Improvements in Mold Loaders, of which the following is a specification, reference being had therein to the accompanying drawings.

The invention relates to loaders for transferring work from a conveyor to a station and is particularly applicable in the manufacture of automobile tires in which continuously moving loading conveyor carrying the molds which contain green or uncured rubber, travels parallel to a series of heaters or vulcanizers. The object of the invention is to provide a portable loader which is mounted upon the frame-work of the load conveyor to move parallel to the series of heaters and which transfers the tire molds to the heaters. Another object is to provide the loader with power driven rolls which substantially fill the gap between the heaters and the loading conveyor. A further object is to convert the loader into an unloader by the provision of means in the loader for drawing the molds from the heaters to the loading conveyor.

With these objects as well as others in view, the invention resides in the novel combinations and arrangements of parts as more fully hereinafter set forth.

In the drawings:

Figure 1 is a top plan view, omitting the raising and lowering mechanism for the deflecting bar, of a loader embodying my invention;

Figure 2 is a side view thereof;

Figure 3 is an end view thereof.

1 is the loading platform conveyor which carries the tire molds to the series of heaters or vulcanizers 2 extending parallel to the conveyor and having their upper ends at substantially the same height as the top of the conveyor. This conveyor has the anti-friction bearing wheels 3 which run upon the parallel tracks 4 carried upon the frame-work 5.

For loading the molds into the heaters 2 I have provided the loader 6 which is movable longitudinally of the conveyor 1 to positions opposite the heaters. The frame of this loader comprises the transverse end beams 7 carried by the standards 8 at a height sufficiently above the conveyor 1 to clear any tire mold carried by the conveyor and also the longitudinal beams 9 above the transverse beams and rigidly secured to each other and to the transverse beams. 10 are anti-friction wheels journalled in the standards and running upon the parallel tracks 11 which are carried upon the conveyor frame-work 5 at opposite sides of the conveyor. 12 is a deflecting or shearing bar preferably of I-beam form which is positioned at an angle to the direction of travel of the conveyor and which is adapted to be lowered from an inoperative position to an operative position adjacent to the top of the conveyor 1 so that the molds being carried by the conveyor are deflected or sheared off the conveyor.

For raising and lowering the deflecting or shearing bar, there is the transverse rock shaft 13 upon the longitudinal beams 9 of the loader frame which has the rock arm 14 fixedly secured thereto. 15 are toggle links pivotally connected to the rock arm and to the upright 16 which latter is secured to the middle of the deflecting or shearing bar and slidably engages the bearing 17 suspended from the longitudinal beams 9. 18 are levers fixedly secured to the ends of the rock shaft beyond the longitudinal beams and having the chains 18' for facilitating the operation of the rock shaft. A weighted arm 19 extending transversely of the rock arm 14 also facilitates in raising and lowering the deflecting or shearing bar as well as holds the same in either of its adjusted positions.

20, 21 and 22 are three rolls having their longitudinal axes parallel to the direction of travel of the platform conveyor 1, the upper surfaces of the rolls being substantially flush with the top of the conveyor. These rolls are journalled in an overhanging portion of the loader frame and are positioned at one side of the conveyor and extend adjacent to the tops of the heaters 2 so that they substantially fill the gap between the heaters and the platform conveyor. These rolls are parallel and the mechanism for driving the same is as follows:

23 is an electric motor mounted upon one of the end transverse beams 7 of the frame. 24 is a drive shaft extending longitudinally of the loader frame and journalled in bearings suspended from the longitudinal beams.

This drive shaft is driven from the electric motor by worm gearing within the casing 25 which in turn is driven by means of the sprocket chain 26 connected to the motor shaft and to the worm shaft 27 extending within the casing 25. 28 is a counter shaft extending parallel to the drive shaft 24 and also journalled in bearings suspended from one of the longitudinal beams. This counter shaft is driven from the drive shaft by suitable means such as the sprocket chain 29 and the outer roll 20 is driven from the counter shaft by the sprocket chain 30 at one end of the roll. At the opposite ends of the rolls, there is a sprocket chain 31 for driving the inner roll 22 from the outer roll 20. The whole arrangement is such that the driving mechanism is out of the path of travel of the molds.

For holding the loader in its longitudinal positions of adjustment so that it will properly transfer the molds from the platform conveyor 1 into the desired heater 2, the deflecting or shearing bar 12 is provided with the pins 32 which extend into apertures in the angle bars 33 upon the framework 5 and above the anti-friction wheels 3 of the platform conveyor.

For the purpose of converting the loader into an unloader to draw molds from the heaters 2 to the platform conveyor 1, there is the concave drum 34 fixed upon the drive shaft 24 and adapted to wind up a flexible connection such as a rope having a hook for engaging the mold.

From the above description it will be readily seen that I have provided a travelling loader which can be converted into an unloader. This loader is mounted upon the frame-work of the conveyor and straddles the conveyor. Also it has power driven rolls to fill the gap between the heaters or vulcanizers and the conveyor. Furthermore, the loader has a deflecting or shearing bar which can be raised and lowered into either inoperative or operative positions and which is provided with means for holding the loader in adjusted position.

By reason of these rolls between the heaters or vulcanizers and the conveyor being power driven and arranged horizontally and substantially level with the tops of the conveyor and of the heaters or vulcanizers, the molds are positively transferred from the conveyor to the heaters or vulcanizers and furthermore, the conveyor need not be elevated to such a height as in constructions where inclined rollers are used over which an object moves by gravity.

What I claim as my invention is:

1. The combination with a conveyor and a parallel series of stations, of a loader above said conveyor and movable along the same for transferring work carried by the conveyor to said stations, and means upon said loader for moving work from said stations to said conveyor.

2. The combination with a conveyor, of a loader above said conveyor comprising a deflecting bar movable adjacent to the top of said conveyor and a series of driven rolls at one side of said conveyor carried by said loader and positioned to receive the work deflected from said conveyor.

3. The combination with a conveyor and frame-work for supporting the same, of a loader above said conveyor and carried by said framework, said loader being movable longitudinally of said conveyor and including a deflecting bar adapted to be lowered to a position adjacent the top of said conveyor, and means upon said deflecting bar engageable with said framework for holding said loader in its adjusted positions.

4. The combination with a conveyor and framework for supporting the same, of a loader above said conveyor and mounted upon said framework, said loader including a deflecting bar, means for raising and lowering said deflecting bar, and pins upon said deflecting bar engageable in said framework for holding said loader in fixed position upon said framework.

5. The combination with a platform conveyor and framework for supporting the same, of a loader movable longitudinally of said platform conveyor and mounted upon said framework, said loader comprising a deflecting bar, means for raising and lowering said deflecting bar, a series of rolls at one side of said platform conveyor and having their axes substantially parallel to the direction of travel thereof, a motor, and means for driving said rolls from said motor.

6. The combination with a platform conveyor and framework for supporting the same, of a loader movable longitudinally of said conveyor and mounted upon said framework, said loader comprising a deflecting bar movable to a position adjacent the top of said conveyor, a series of rolls at the side of said conveyor, and having their axes substantially parallel to the path of direction taken by said conveyor, a drive shaft, means for driving said rolls from said drive shaft, a drum fixed upon said drive shaft, a motor, and means for driving said drive shaft from said motor including reduction gearing.

7. The combination with a conveyor and framework for supporting the same, of a loader movable longitudinally of said conveyor and carried upon said framework, said loader including a frame, a deflecting bar, an upright secured to said deflecting bar and slidably mounted upon said frame, a rock shaft, an arm fixed upon said rock shaft, and a link pivotally connected to said arm and to said upright.

8. The combination with a platform conveyor and framework for suporting the same, of a loader movable longitudinally of said platform conveyor and straddling the same, said loader being mounted upon said framework and comprising a deflecting bar, a series of rolls at one side of said platform conveyor, and means upon said loader for driving one of said rolls.

9. The combination with a conveyor of a loader above said conveyor and movable along the same, said loader comprising a member for deflecting work from said conveyor and a power driven member for moving work to said conveyor.

In testimony whereof I affix my signature.

JESSE E McBRIDE.